US007198190B2

(12) United States Patent
Juhan et al.

(10) Patent No.: US 7,198,190 B2
(45) Date of Patent: Apr. 3, 2007

(54) IDENTIFICATION DEVICE HAVING REUSABLE TRANSPONDER

(76) Inventors: Dodge Juhan, 17111 Flanders St., Granada Hills, CA (US) 91344; Dean D. Peterson, 13880 Del Sur St., San Fernando, CA (US) 91340; Charles E. Wilson, 13880 Del Sur St., San Fernando, CA (US) 91340

( * ) Notice: Subject to any disclaimer, the term of this patent is extended or adjusted under 35 U.S.C. 154(b) by 0 days.

(21) Appl. No.: 10/858,835

(22) Filed: Jun. 1, 2004

(65) Prior Publication Data

US 2005/0066563 A1 Mar. 31, 2005

Related U.S. Application Data

(63) Continuation-in-part of application No. 09/033,832, filed on Mar. 3, 1998.

(60) Provisional application No. 60/040,962, filed on Mar. 12, 1997.

(51) Int. Cl.
*G06K 5/00* (2006.01)

(52) U.S. Cl. ................... 235/380; 235/385; 340/573.1; 343/700; 343/718; 602/62

(58) Field of Classification Search ................ 235/380, 235/385; 340/573.1; 602/62; 368/10; 343/718, 343/700
See application file for complete search history.

(56) References Cited

U.S. PATENT DOCUMENTS 4,475,481 A 10/1984 Carroll
4,598,275 A 7/1986 Ross et al.
4,612,719 A 9/1986 de Jong
4,718,374 A 1/1988 Hayes
5,119,072 A * 6/1992 Hemingway ............. 340/573.1
5,140,946 A 8/1992 Pennock et al.
5,168,281 A 12/1992 Tokunaga
5,323,554 A 6/1994 MacDonald
5,343,608 A * 9/1994 MacDonald ................. 29/450
5,448,110 A 9/1995 Tuttle et al.
5,461,807 A 10/1995 Johnson
5,479,797 A 1/1996 Peterson
5,588,234 A 12/1996 de Jong et al.
5,740,623 A * 4/1998 Juhan et al. .................. 40/633
5,886,669 A * 3/1999 Kita ........................... 343/718
5,986,566 A 11/1999 Yamamori
6,181,287 B1 1/2001 Beigel
6,398,749 B1 * 6/2002 Slautterback ................ 602/62
6,526,158 B1 * 2/2003 Goldberg .................... 382/115

(Continued)

*Primary Examiner*—Michael G. Lee
*Assistant Examiner*—Allyson N Trail
(74) *Attorney, Agent, or Firm*—Kelly Lowry & Kelley LLC

(57) ABSTRACT

An identification band for attachment to an individual or object includes an at least partially non-transparent elongated hollow body having first and second opposite ends. The body also includes a substantially flat intermediate portion with top and bottom surfaces and semi-circular edges, and a pair of fastening openings formed respectively at the first and second ends. A connector is configured for interference fit reception into the fastening openings for removably attaching the first and second ends of the body. The connector is removable from the fastening openings and adapted for subsequent assembly and re-use with a replacement body. A machine readable radio frequency identification chip is associated with the body, and an antenna is operatively connected to the chip.

22 Claims, 2 Drawing Sheets

U.S. PATENT DOCUMENTS

2004/0021573 A1* 2/2004 Hoffman et al. ......... 340/573.1
2004/0140898 A1* 7/2004 Reeves .................... 340/573.1
2004/0151071 A1* 8/2004 Kocher ........................ 368/10
2005/0021369 A1* 1/2005 Cohen et al. .................. 705/2
2005/0125363 A1* 6/2005 Wilson et al. ................ 705/75
2005/0168340 A1* 8/2005 Mosher et al. ........... 340/572.8
2005/0201450 A1* 9/2005 Volpi et al. ................. 375/150
2005/0205202 A1* 9/2005 Chaoui et al. .............. 156/269

* cited by examiner

JOHN DOE
JOHN DOE

IDENTIFICATION DEVICE HAVING REUSABLE TRANSPONDER

RELATED APPLICATION

This application claims the benefit of U.S. Provisional Application No. 60/040,962, filed Mar. 12, 1997, and priority is claimed as a continuation-in-part to Utility patent application Ser. No. 09/033,832, filed Mar. 3, 1998.

BACKGROUND OF THE INVENTION

This invention relates to RF identification devices and, more particularly, to RF identification devices designed to permit the transmission of information about a person or thing to whom or which the RF identification devices are secured. The RF identification devices of the instant invention have particular application in the identification of individuals and the transmission of relevant information about said individuals to a master receiving and transmitting station whereby, when said master station addresses the RF identification devices on particular individuals, it will be able to ascertain various aspects of relevant data pertinent to the condition, situation, or other pertinent information about the individual.

Of course, a hand-held reader capable of receiving information from the identification device of the instant invention and, in certain instances, of transmitting information to the memory of the identification device of the instant invention for storage therein, can be used in substitution for the master station referred to hereinabove.

At the present time, identification devices such as wristbands or the like are widely used in hospitals to identify patients and to provide information regarding the patients. Such wristbands are also utilized in various other applications, including prisoner identification and crowd control. Initially, such wristbands were confined to providing the bare minimum of the patient's name and, possibly, the nature of the patient's illness. Recently, such wristbands have been provided with encoded information in the form of bar codes or the like whereby considerable additional information about the patient can be ascertained, including such relevant data as medication, the patient's condition, or the like.

In utilizing such wristbands, bar code readers are provided to the nursing or other staff members and the nurse or other staff member reads the bar code before administering medication or performing various therapeutic measures.

While the use of bar codes or other encoded materials has constituted a considerable advance, once the bar code has been applied to the identification wristband, the alteration of the information on the wristband entails the substitution of a new wristband. In addition, because of physical limitations, the information imparted by bar codes or the like is necessarily limited.

A possible solution which would overcome the limitations of identification wristbands which are bar-coded or the like would be to provide an RF circuit in the wristband which would incorporate a semi-conductor circuit with logic, memory, and an RF circuit connected to an antenna capable of receiving and transmitting information so that a nurse or other staff member carrying a transponder could query the RF circuit of the wristband to elicit a wide spectrum of information not presently available in conventional wristbands.

Unfortunately, available RF circuits are relatively expensive and, since conventional wristbands are disposable after use, such circuits would have to be discarded if they were integral components of the wristband.

Conventional identification wristbands are generally of substantially flat cross-section and consist of one or more laminates of various types of material including vinyl plastic, synthetic papers and the like. Although every effort is made to provide wristbands which are sufficiently soft so that the opposite edges of the band do not irritate the skin of the wearer, the utilization of conventional wristbands in environments where the wristband is installed upon the wrist of a patient or a prisoner for an extended period of time, irritates the skin of the wearer of the band.

This is particularly true in circumstances where the skin of the individual wearing a conventional band tends to be more friable than other individuals, such as the skin of a person committed for a long period of time to a rest home or convalescent facility. It is well known to those skilled in the art that the skin of these individuals tends to be more subject to abrasion and contusion than the skin of more mobile healthy individuals. This is due, in part, to the fact that many of these individuals are not ambulatory and are relatively immobile in beds or wheelchairs.

Under such circumstances, the conventional identification wristband tends to be rubbed sharply against the skin of the immobile individual and to gradually abrade the skin, causing cuts or sores which are highly undesirable in the rest home or convalescent home environment.

Prior art U.S. Pat. Nos. 5,323,554 and 5,343,608 show a circular tube utilized as an identification wristband body including a cylindrical connector and complicated method of securement of the opposite extremities of the tubular body to each other. This construction provides only lineal contact with the skin of the wearer and there is a tendency for the cylindrical body of the band to roll thus causing friction with the skin of the wearer and the misplacement of the identification card or tag which is located within the body.

Accordingly, what is needed is a wristband that provides a comfortable fit for the wearer. There is a further need for a wristband that allows the wearer to be identifiable. There is an additional need for a wristband that includes reusable elements. The present invention satisfies these needs and provides other related advantages.

SUMMARY OF THE INVENTION

An identification band for attachment to an individual or object includes an at least partially non-transparent elongated hollow body having first and second opposite ends. The body also has a substantially flat intermediate portion with top and bottom surfaces and semi-circular edges, and a pair of fastening openings formed respectively at the first and second ends.

A connector is configured for interference fit reception into the fastening openings for removably attaching the first and second ends of the body. The connector is removable from the fastening openings and adapted for subsequent assembly and reuse with a replacement body.

A machine readable radio frequency identification chip is associated with the body. An antenna is operatively connected to the chip.

The fastening openings move between a first configuration having a dog-bone-shaped cross-section to a second configuration configured for interference fit reception with the connector when the connector matingly engages the first and second ends of the body.

Both the chip and the antenna may be embedded in the connector.

The identification band includes a card inserted within the body and the chip may be embedded within the card.

A label may be adhered on the exterior of the body and the chip may be embedded within the label.

The present invention provides an RF identification device that attaches onto a person or object to be identified and is secured in operative relationship with the person or object. For instance, the device adapted for hospital patient use can be in the form of a wristband and the wristband can be maintained in operative relationship with the wrist of the patient by a connector which holds the wristband on the patient's wrist, ankle or the like.

The present invention provides an RF circuit located in the connector and, when the wristband is discarded, the connector can be sterilized and reused, thus permitting the reuse of the RF circuit with the consequent economies resulting from such reuse.

The present invention provides a wristband wherein the connector incorporates an RFID chip operatively connected to a separate antenna or a complete RFID tag including the antenna so that the necessity for securing the RFID device to a separate antenna is eliminated.

The present invention provides an identification wristband suitable for prolonged installation upon the wrist of convalescent or rest home patients which will eliminate the abrasion commonly encountered by the use of conventional identification wristbands.

The present invention provides an identification wristband having a substantially flat intermediate portion with top and bottom surfaces and semi-circular hollow edges providing cushions at the opposite edges of the band which eliminate the cutting or abrasion of the skin and which also prevent the rolling or twisting of the band.

Other features and advantages of the invention will become more apparent from the following detailed description, taken in conjunction with the accompanying drawings which illustrate, by way of example, the principles of the invention.

BRIEF DESCRIPTION OF THE DRAWINGS

The accompanying drawings illustrate the invention. In such drawings.

DETAILED DESCRIPTION OF THE EMBODIMENTS

Figure 1:
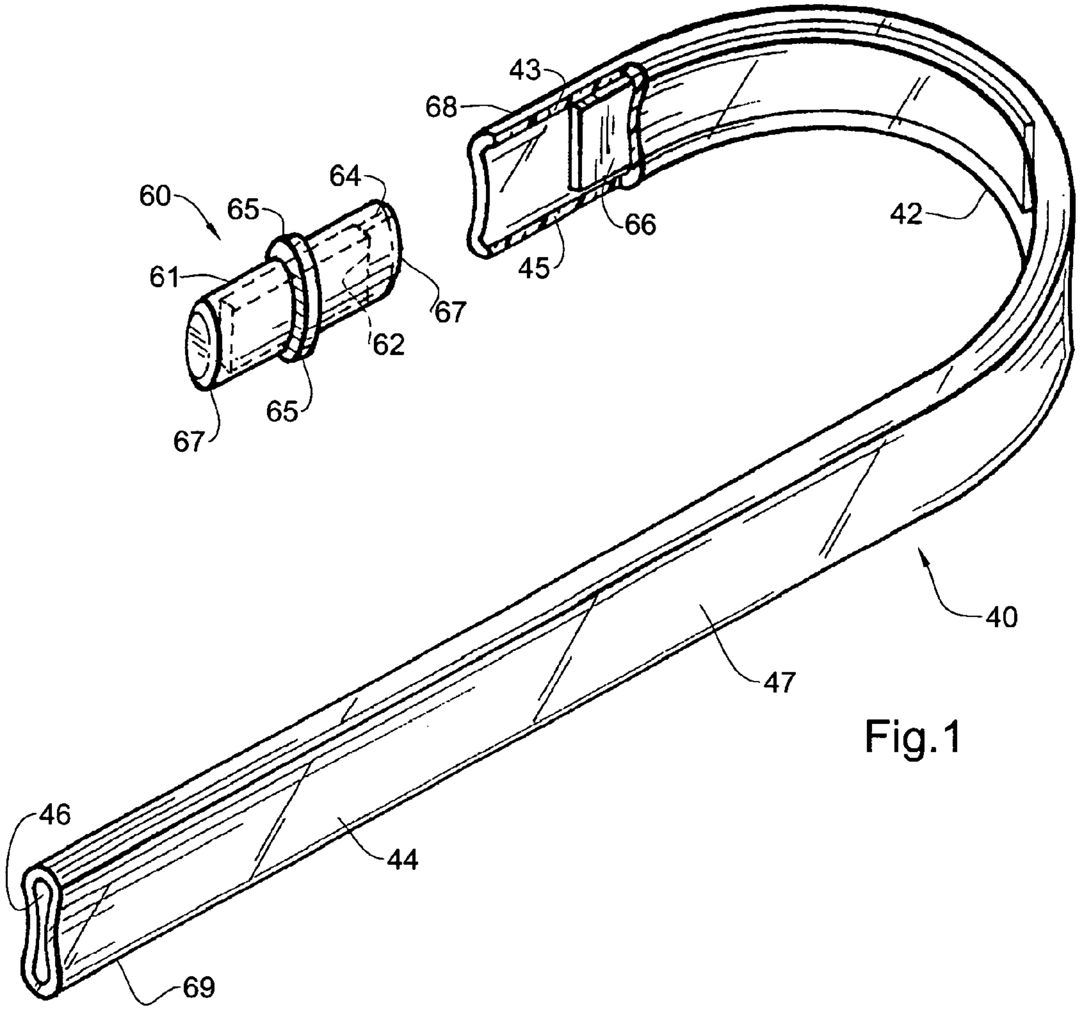
FIG. 1 is a view showing a wristband embodying the present invention.

Referring to the drawings, and particularly to FIGS. 1–7 thereof, RFID wristbands are shown at 40, 70 in FIGS. 1–7 of the drawings as including an attachment means 42, 72 constituted by an elongated tubular strip or band 44, 74 having an internal chamber 46, 76 provided therein. The construction and mode of operation of the band 44, 74 and securement means 60, 78 provided for usage therein are disclosed herein, as seen in FIGS. 1–7; based upon the previous incorporation by reference herein of the disclosure of Ser. No. 08/787,757, filed Jan. 28, 1997, entitled TUBULAR IDENTIFICATION WRISTBAND, now U.S. Pat. No. 5,740,623, in co-pending application Ser. No. 09/033,832, filed Mar. 3, 1998, entitled IDENTIFICATION DEVICE HAVING REUSABLE TRANSPONDER, from which priority is claimed.

Figure 2:
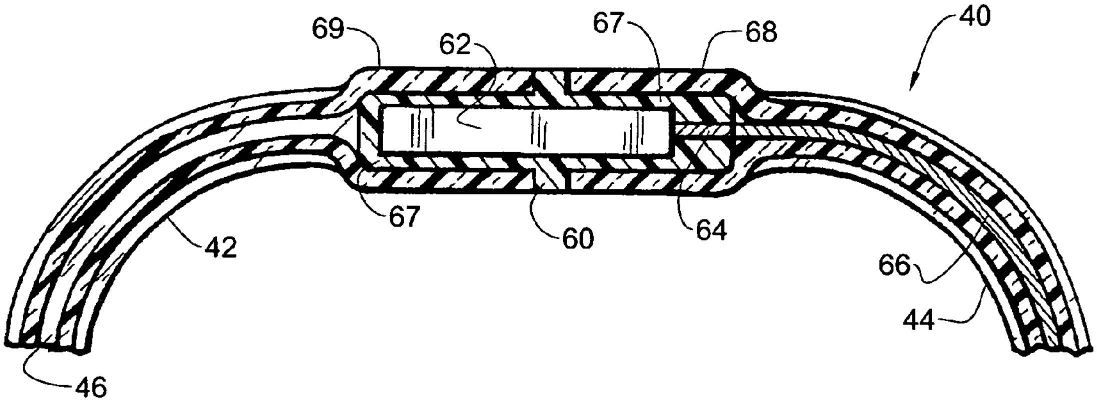
FIG. 2 is a sectional view of a connector disposed in operative relationship with the extremities of the wristband.

In FIGS. 1 and 2, an identification wristband 40 is shown which includes the attachment means 42 in the form of the elongated tubular body 44 fabricated from a synthetic plastic material (e.g., polyvinyl chloride, high density polyethylene, polystyrene, a transparent plastic, a non-transparent plastic or the like), and the securement means 60, in the form of a connector 61, which may be fabricated from synthetic plastic such as general purpose polystyrene or the like through an injection molding process. The elongated tubular body 44 has opposite extremities 68, 69 which are relatively sharp and which could cause abrasion of the skin of a person upon whom the band 40 is installed for a long period of time.

The elongated tubular body 44 is fabricated by an extrusion process wherein the polyvinyl chloride or other material from which it is fabricated is extruded through a die which imparts the cross-sectional profile of said body to the polyvinyl material. After extrusion, the elongated resultant tubing is cut into desired lengths conformable to the broad spectrum of wrist or other sizes for which the body is to be utilized.

The tubular cross-section of the body 44 is defined by an intermediate flat portion or area 47 which is located between the opposite upper and lower edges 43, 45 of the body 44. The edges 43, 45, can be semi-circular, semi-elliptical, semi-ovoid or the like. Therefore, the intermediate flat portion 47 of the body 44 imparts a relatively reduced cross-section to the interior of the tubular body for purposes which will be described in greater detail below.

The connector 61 is of elliptical cross-section and has, intermediate its extremities 67, an abutment 65 engagable by the corresponding extremities 68, 69 of the tubular body 44. The abutment 65 is semi-elliptical in cross-section and, when the opposite extremities 67 of the connector 61 are inserted in the extremities 68, 69 of the body, the sharp edges of the extremities 68, 69 engage the opposite sides of the abutment 65, and the outer rounded perimeter of the abutment 65 isolates the sharp edges of the extremities 68, 69 from engagement with the skin of a wearer of the identification wristband 40. The abutment 65 and extremities 67 can also have other cross-sectional shapes including, without limitation, rectangular, circular, ovoid or the like.

When the opposite elliptical extremities 67 of the connector 61 are inserted in the flattened extremities 68, 69 of the band body 44, the body extremities 68, 69 are distended from the flattened configuration of the body 44 into a configuration corresponding to that of the extremities 67 of the connector 61 resulting in an interference fit with the extremities 68, 69 of the band body 44 and creating a frictional lock which cannot be easily released to permit the release of the identification wristband 40 from operative engagement with the wrist of a wearer.

The securement means 60, in the form of the connector 61, is fabricated from a suitable synthetic plastic (e.g., polyvinyl chloride, high density polyethylene, polystyrene, transparent plastic, a non-transparent plastic or the like) and has an IC chip, RFID chip or RFID module 62 incorporated therein with a conductive contact or contacts 64 provided on the surface of the securement means 60 for engagement with one or more conductors (not shown) of an antenna 66 located in the chamber 46 of the band or body 44. The RFID chip 62 may be formed with connector 61 during an injection molding process. Alternatively, a receptacle can be formed in the securement means 60 and the IC chip, RFID chip or RFID module 62 can be located in the receptacle for reuse in conjunction with the securement means 60. The attachment means 42 may be made of the same and/or similar materials as securement means 60.

The chip 62 is shown in FIG. 2 of the drawings with the opposite extremities 68, 69 of the body 44 secured on the opposite extremities of the securement means 60.

Where an antenna 66 is used, it is located in one extremity 68, 69 of the chamber 46 and that extremity 68, 69 is marked to indicate the location of the extremity 68, 69 of the band or body 44 which incorporates the antenna 66. The antenna 66 can also be imprinted or otherwise applied to the wall of the chamber 46, if desired. In another alternative, the antenna can be embedded in connector 61. The chip 62 is located inside the securement means 60 and its contact(s) 64 engages a corresponding conductor(s), (not shown), on the antenna 66.

Consequently, the securement means 60 can be separated from the strap or body portion 44 of the attachment means 42 by disengaging it from the extremities 68, 69. The strap or body portion 44 of the attachment means 42 can be discarded and the securement means 60 can be sterilized and returned to a point of use, such as an admittance desk. At the admittance desk, when a patient is admitted, the chip 62 can be loaded with relevant data and associated with the attachment means 42 by wrapping the band 44 around a limb of the patient and engaging the securement means 60 with the attachment means 42. The contacts (not shown) of the antenna 66 are brought into engagement with the corresponding contacts 64 of the chip or RFID module 62.

Therefore, the continued repeated usage of the securement means 60 and the chip or module 62 materially reduces the per-patient cost of the RF identification device 40. Although the use of an antenna 66 in conjunction with the RFID module 62 has been disclosed, it is to be understood that a self-contained RFID module can be utilized with the module incorporating its own antenna, thus eliminating the necessity for providing an antenna, such as the antenna 66 in the wristband 40.

Other than the conductive means between the antenna 66 and the chip 62, it is also possible to utilize the capacitative circuit disclosed in the application, Ser. No. 60/040,143 filed Mar. 10, 1997, entitled REACTIVELY COUPLED ELEMENTS IN CIRCUITS ON FLEXIBLE SUBSTRATES, now U.S. Pat. No. 6,181,287. The capacitative circuits of the two embodiments of that application can be applied with equal cogency to the RF circuit or chip 62.

Furthermore, the antenna 66 can also be incorporated in the securement means 60 if the design parameters of the circuitry permit.

Therefore, when the securement means 60 and the attachment means 42 are assembled in the manner of FIG. 2 (i.e., extremities 67 of the securement means and extremities 68, 69 of the attachment means 42 are engaged), the chip 62 is electrically connected to the antenna 66 and the chip 62 and antenna can serve to receive and transmit signals in response to a suitably designed RFID reader. When the patient is discharged from the hospital, the band or body 44 is disposed of for sanitary reasons and the securement means 60 can be sterilized and reused, thus achieving the economies incident to reuse of the chip 62.

In FIGS. 3–7, an identification wristband 70 is shown which includes the attachment means 72 in the form of the elongated tubular body 74 fabricated from a synthetic plastic material (e.g., polyvinyl chloride, high density polyethylene, polystyrene, a transparent plastic, a non-transparent plastic or the like), and the securement means 78, in the form of a connector 80 which may be fabricated from synthetic plastic such as general purpose polystyrene or the like through an injection molding process. The elongated tubular body 74 has opposite extremities 82, 84 which are relatively sharp and which could cause abrasion of the skin of a person upon whom the band 70 is installed for a long period of time.

The elongated tubular body 74 is fabricated by an extrusion process wherein the polyvinyl chloride or other material from which it is fabricated is extruded through a die which imparts the cross-sectional profile of said body to the polyvinyl material. After extrusion, the elongated resultant tubing is cut into desired lengths conformable to the broad spectrum of wrist or other sizes for which the body is to be utilized.

The tubular cross-section of the body 74 is defined by an intermediate flat portion or area 86 which is located between the opposite upper and lower edges 88, 90 of the body 74. The edges 88, 90 can be semi-circular, semi-elliptical, semi-ovoid or the like. Therefore, the intermediate flat portion 86 of the body 74 imparts a relatively reduced cross-section to the interior of the tubular body for purposes which will be described in greater detail below.

The connector 80 is of elliptical cross-section and has, intermediate its extremities 91, an abutment 92 engagable by the corresponding extremities 82, 84 of the tubular body 74. The abutment 92 is semi-elliptical in cross section and, when the opposite extremities of the connector 80 are inserted in the extremities 82 and 84 of the body, the sharp edges of the extremities 82, 84 engage the opposite sides of the abutment 92, and the outer rounded perimeter of the abutment 92 isolates the sharp edges of the extremities 82, 84 from engagement with the skin of a wearer of the identification wristband 70. The abutment 92 and extremities 91 can also have other cross-sectional shapes including, without limitation, rectangular, circular, ovoid or the like.

When the opposite elliptical extremities 91 of the connector 80 are inserted in the flattened extremities 82, 84 of the band body 74, the body extremities 82, 84 are distended from the flattened configuration of the body 74 into a configuration corresponding to that of the extremities 91 of the connector 80 resulting in an interference fit with the extremities 82, 84 of the band body 74 and creating a frictional lock which cannot be easily released to permit the release of the identification wristband 70 from operative engagement with the wrist of a wearer.

An elongated information card 94 is provided for insertion into the cavity 76 of the wristband body 74 and includes readable information 96 which can be perused by an interested party. Such information customarily incorporates the name of the wearer of the band and various other pertinent data relating to said wearer. In addition, bar codes and similar symbology can be placed on the surface of the information card 94 to facilitate access to further data regarding the wearer of the band. An RFID chip 98 or module can be embedded in the card 94. An antenna 99 can be embedded in the card 94 and operatively connected to the chip 98. Alternatively, the antenna 99 can be imprinted or otherwise applied to the wall of the chamber 76 and operatively connected to the chip 98. In another alternative, the antenna 94 can be embedded in the connector 80 and operatively connected to the chip 98.

Figures 3, 4, 5, 6, 7:
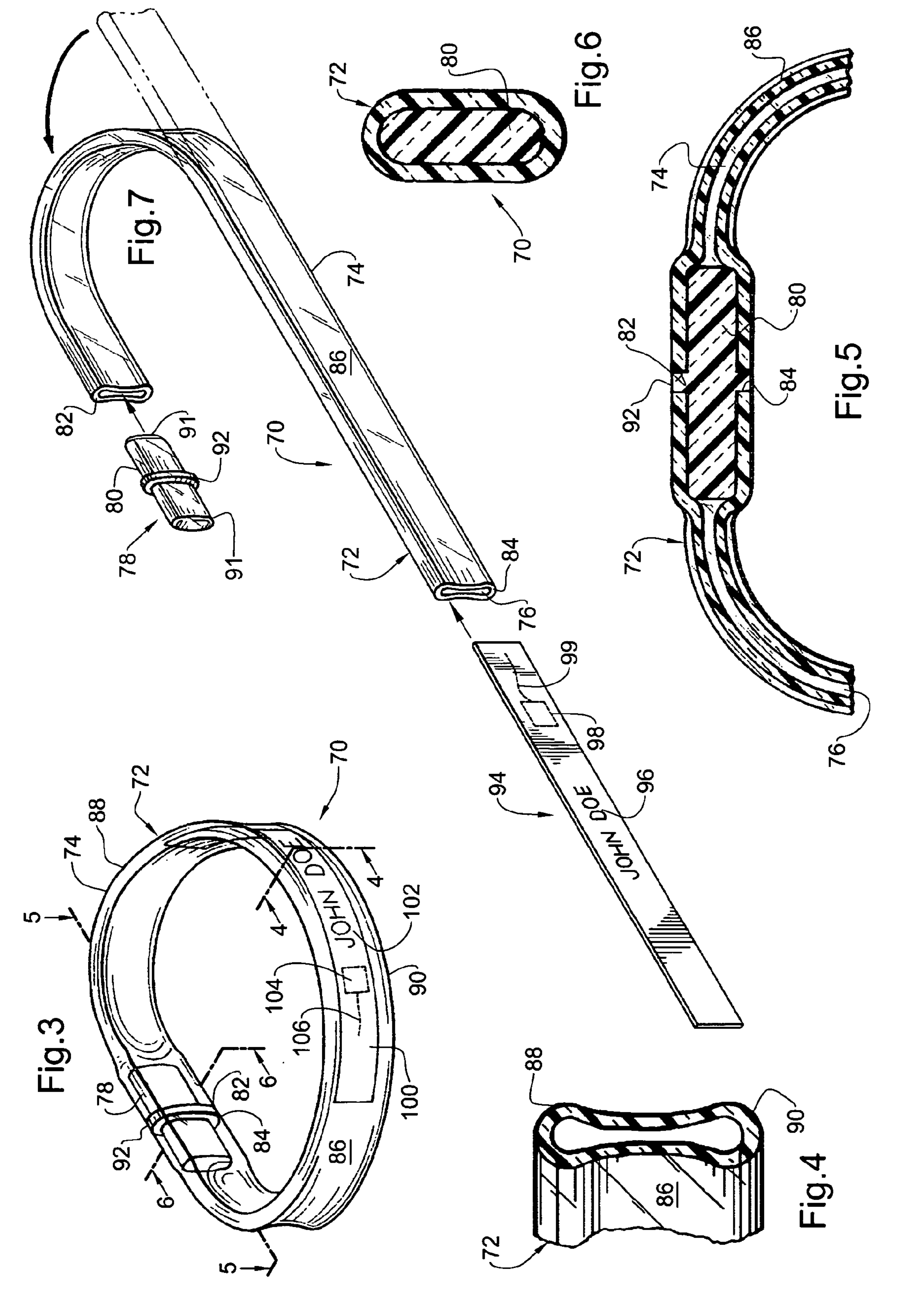
FIG. 3 is a view showing another identification wristband embodying the present invention with its opposite extremities secured by a connector.
FIG. 4 is a vertical sectional view taken on the broken line 4—4 of FIG. 3.
FIG. 5 is a longitudinal sectional view taken on the broken line 5—5 of FIG. 3.
FIG. 6 is a transverse sectional view taken on the broken line 6—6 of FIG. 3.
FIG. 7 is an enlarged schematic view illustrating the relationship of the various components of an identification wristband embodying the present invention with one another.

As best shown in FIG. 7 of the drawings, the card 94, when inserted into the tubular cavity 76 of the wristband 70, has its opposite surfaces closely juxtaposed to the inner surfaces of the flattened portions 86 of the wristband body 74. This close juxtaposition enhances the legibility of the informational material on the card 94 and also prevents the shifting of the card 94 within the confines of the band 70. In this embodiment, the band 74 or at least a portion of the intermediate area 86 would have to be transparent. A card 94 can still be used with a non-transparent body 74 although visual information on the card 94 would not be visible or would be blurred if the band 70 were translucent.

As seen in FIG. 3, an adhesive label 100 is provided for attachment to an exterior surface of the wristband body 74 and includes: readable information 102 which can be perused by an interested party. Such information customarily incorporates the name of the wearer of the band and various other pertinent data relating to said wearer. In addition, bar codes and other symbology can be placed on the surface of the label 100 to facilitate access to further data regarding the wearer of the band. An RFID chip 104 or module can be embedded in the label 100. An antenna 106 can be embedded in the label 100 and operatively connected to the chip 104. Alternatively, the antenna 106 can be imprinted or otherwise applied to the wall of the chamber 76 and operatively connected to the chip 104.

To install the wristband 70 on the wrist of a wearer, it is simply necessary to cut the length of the band 74 to fit the wrist of the wearer, cut the length of the information card 94 as required, if the card 94 is being used, insert the information card 94 and engage the opposite extremities 91, of the connector 80 into the wristband cavity. The opposite extremities 91 of the connector 80 must be inserted with considerable force into the opposite extremities 82, 84 of the wristband body 74 to distend the sharp edges of the extremities of the body 74 into intimate contact with the sides of the abutment 92 thus isolating the edges from contact with the skin of the wrist of the wearer of the band 70.

When so installed upon the wearer's wrist, gentle contact with the skin of the wearer is attained because of the cushion effect of the semi-elliptical upper and lower edges 88, 90 of the band body 74. In addition, the planarity of the intermediate flat areas 86 of the band body 74 eliminates any tendency to pinch or roll upon the wearer's wrist and, thus, forestalls the formation of cuts or lesions which are inimical to the health of a confined person.

It is contemplated that, when the connector 61, 80 matingly engages the opposite extremities 68, 69, 82, 84 of the wristband 40, 70, the fastening openings of the extremities 68, 69, 82, 84 move between a first configuration having a dog-bone shaped cross-section (see FIGS. 1, 3, 4, 7) to a second configuration for interference fit reception with the connector 61, 80. The second configuration can be circular, ovoid, elliptical or any polygonal shape that adapts to the shape of opposite extremities 67, 91 of the connector 61, 80.

It is also contemplated that the cross-sectional configuration of the wristband 40, 70 be modified to include such cross-sections as elliptical or ovoid and that corresponding modifications of the shape of the connector be made so that the connector 61, 80 will fit into the opposite extremities 68, 69, 82, 84 of the wristband 40, 70. For instance, an ovoid wristband will have an ovoid connector and an elliptical wristband will have an elliptical connector. Therefore, it is not intended that the cross-section of the wristband be limited to that of the preferred embodiment since many non-circular configurations can be substituted therefor.

In the alternative embodiment of the invention, a chip can be inserted in the internal chamber 46, 76 of the tubular strip or band 44, 74 of the attachment means 42, 72. The chip can be operatively connected to the antenna 66. In an alternative embodiment, a complete RFID tag with antenna can be incorporated into securement means 60, 78.

Moreover, it is also possible to incorporate an RFID chip in the pocket of pocket-style wristbands such as that disclosed in U.S. Pat. No. 5,581,924. After the wristband has been utilized, the chip can be removed from the pocket and the wristband discarded. The chip can be sterilized and re-used in the same manner as the chip of the previously-discussed embodiment of the invention.

As outlined above, an antenna 99, 106 can be formed in the card 94 or label 100. The antenna 99, 106 can be electrically connected to the chip 98, 104 by conductive bosses (not shown) on the chip 98, 104 engaging corresponding conductors (not shown) on the antenna 99, 106. The antenna 99, 106 can be fabricated, in conjunction with the fabrication of the card 94 or label 100, by various methods including foil strips, the use of conductive inks or conductive wires. The figures are not intended to indicate the requisite length of the antenna 99, 106 since this is determined by the characteristics of the chip 98, 104 or RFID module.

The conductive bosses can be fabricated in any desirable configuration and are not limited to a buss configuration. For instance, conventional cylindrical contacts can be substituted for the buss bar configuration.

The teachings of the invention relating to reuse of a significant component portion of an identification wristband or the like can be applied with equal cogency to a wide variety of devices to be attached to an object or person whose identity and other significant data must be detected for various reasons.

The above-described embodiments of the present invention are illustrative only and not limiting. It will thus be apparent to those skilled in the art that various changes and modifications may be made without departing from this invention in its broader aspects. Therefore, the appended claims encompass all such changes and modifications as falling within the true spirit and scope of this invention.

What is claimed is:

1. An identification band for attachment to an individual or object, comprising:

an at least partially non-transparent elongated hollow body having first and second opposite ends, a substantially flat intermediate portion with top and bottom surfaces and semi-circular edges, and a pair of fastening openings formed respectively at the first and second ends;

a connector configured for interference fit reception into the fastening openings for removably attaching the first and second ends of the body, wherein the connector is removable from the fastening openings and adapted for subsequent assembly and re-use with a replacement body;

a machine readable radio frequency identification chip associated with the body; and an antenna operatively connected to the chip;

wherein the fastening openings move between a first configuration having a dog-bone-shaped cross section to a second configuration configured for interference fit reception with the connector when the connector matingly engages the first and second ends of the body.

2. The identification band of claim 1, wherein the antenna is embedded in the connector.

3. The identification band of claim 1, including a card inserted within the body.

4. The identification band of claim 3, wherein the chip is embedded within the card.

5. The identification band of claim 1, including a label adhered on the exterior of the body.

6. The identification band of claim 5, wherein the chip is embedded within the label.

7. The identification band of claim 1, wherein the chip is embedded within the connector.

8. An identification band for attachment to an object or individual to be identified, comprising:

an at least partially non-transparent elongated hollow body having first and second opposite ends, a substantially flat intermediate portion with top and bottom surfaces and semi-circular edges, and a pair of fastening openings formed respectively at the first and second ends;

a connector configured for interference fit reception into the fastening openings for removably attaching the first and second ends of the body, the connector including a machine readable radio frequency identification chip, and being removable from the fastening openings and adapted for subsequent assembly and re-use with a replacement body; and an antenna operatively connected to the chip;

wherein the fastening openings move between a first configuration having a dog-bone-shaped cross-section to a second configuration configured for interference fit reception with the connector when the connector matingly engages the first and second ends of the body.

9. The identification band of claim 8, including a card inserted within the body.

10. The identification band of claim 8, including a label adhered on the exterior of the body.

11. The identification band of claim 8, wherein the antenna is embedded in the connector.

12. An identification band for attachment to an object or individual to be identified, comprising:

an at least partially non-transparent elongated hollow body having first and second opposite ends, a substantially flat intermediate portion with top and bottom surfaces and semi-circular edges, and a pair of fastening openings formed respectively at the first and second ends;

a connector configured for interference fit reception into the fastening openings for removably attaching the first and second ends of the body, the connector including a machine readable radio frequency identification chip, and being removable from the fastening openings and adapted for subsequent assembly and re-use with a replacement body;

an antenna embedded in the connector and operatively connected to the chip; and a card inserted within the body and visible to a user through a transparent portion of the body;

wherein the fastening openings move between a first configuration having a dog-bone-shaped cross section to a second configuration configured for interference fit reception with the connector when the connector matingly engages the first and second ends of the body.

13. An identification band for attachment to an individual or object, comprising:

an at least partially non-transparent elongated hollow body having first and second opposite ends, a substantially flat intermediate portion with top and bottom surfaces and semi-circular edges, and a pair of fastening openings formed respectively at the first and second ends;

a connector configured for interference fit reception into the fastening openings for removably attaching the first and second ends of the body, wherein the connector is removable from the fastening openings and adapted for subsequent assembly and re-use with a replacement body;

a machine readable radio frequency identification chip associated with the body; and an antenna operatively connected to the chip;

wherein the fastening openings move between a first configuration having a flattened cross section to a second configuration having a distended cross-section configured for interference fit reception with the connector when the connector matingly engages the first and second ends of the body.

14. The identification band of claim 13, wherein the antenna is embedded in the connector.

15. The identification band of claim 13, including a card inserted within the body wherein the chip is embedded within the card.

16. The identification band of claim 13, including a label adhered on the exterior of the body wherein the chip is embedded within the label.

17. The identification band of claim 13, wherein the chip is embedded within the connector.

18. An identification band for attachment to an individual or object, comprising:

an at least partially non-transparent elongated hollow body having first and second opposite ends, a non-circular intermediate portion with top and bottom surfaces and curved edges, and a pair of fastening openings formed respectively at the first and second ends;

a connector configured for interference fit reception into the fastening openings for removably attaching the first and second ends of the body, wherein the connector is removable from the fastening openings and adapted for subsequent assembly and re-use with a replacement body;

a machine readable radio frequency identification chip associated with the body; and an antenna operatively connected to the chip;

wherein the fastening openings move between a first configuration having a non-circular cross section to a second configuration having a distended cross-section configured for interference fit reception with the connector when the connector matingly engages the first and second ends of the body.

19. The identification band of claim 18, wherein the antenna is embedded in the connector.

20. The identification band of claim 18, including a card inserted within the body wherein the chip is embedded within the card.

21. The identification band of claim 18, including a label adhered on the exterior of the body wherein the chip is embedded within the label.

22. The identification band of claim 18, wherein the chip is embedded within the connector.

* * * * *